No. 898,176. PATENTED SEPT. 8, 1908.
H. E. BERKEY.
CLASP.
APPLICATION FILED JULY 27, 1906.
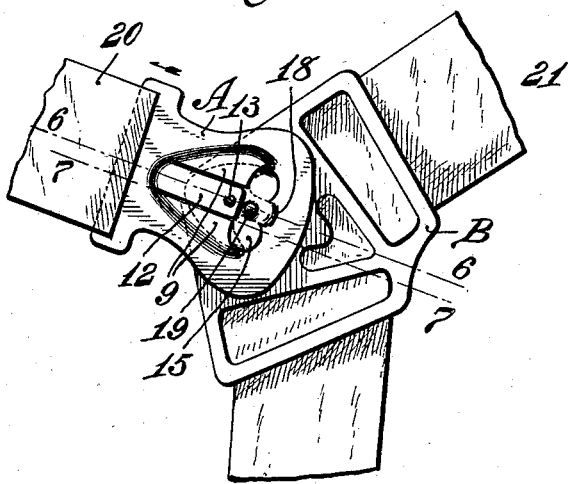
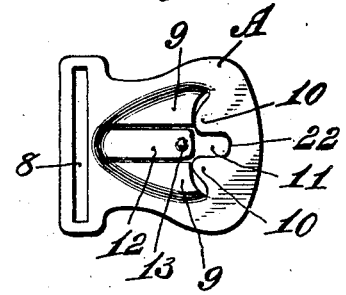
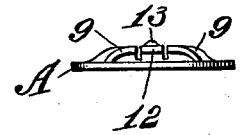
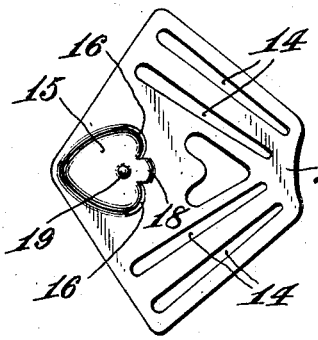
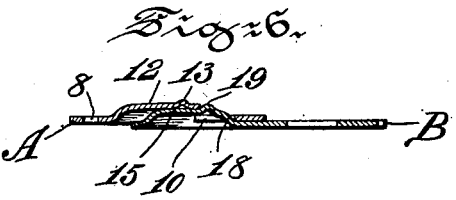
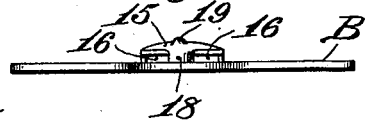
WITNESSES:
Mae Hofmann
Jas. C. Wobensmith
INVENTOR
Harvey E. Berkey,
BY
Jno. E. Croasdale,
ATTORNEY.
THE NORRIS PETERS CO., WASHINGTON, D. C.

UNITED STATES PATENT OFFICE.

HARVEY E. BERKEY, OF MONONGAHELA, PENNSYLVANIA, ASSIGNOR TO PIONEER SUSPENDER COMPANY, A CORPORATION OF PENNSYLVANIA.

CLASP.

No. 898,176.　　　　Specification of Letters Patent.　　　　Patented Sept. 8, 1908.

Application filed July 27, 1906. Serial No. 327,992.

*To all whom it may concern:*

Be it known that I, HARVEY E. BERKEY, a citizen of the United States, residing at Monongahela, in the county of Washington and State of Pennsylvania, have invented a new and useful Clasp, of which the following is a specification.

My invention relates to hose supporter clasps, or separable fasteners, such as are used in connection with elastic webbing.

The object of my invention is to produce a fastener comprising two parts of sheet metal, preferably of spring metal, which shall be simple and inexpensive in construction, efficient in engagement, readily connected and disconnected, and capable of limited pivotal movement relatively when connected.

Referring to the drawings:—Figure 1 is a plan view of the device in the connected or operative position, showing portions of the webbing engaged therewith. Fig. 2 is a plan view of the hook member. Fig. 3 is a front elevation of same. Fig. 4 is a plan view of the triangle member. Fig. 5 is a front elevation of same. Fig. 6 is a sectional view through line 6, 6 of Fig. 1. Fig. 7 is a sectional view through line 7, 7 of Fig. 1.

Similar numerals refer to similar parts throughout the several views.

The hook member or plate A, having the slot 8 for the webbing, is provided in its middle portion with the triangular or heart-shaped or tapered boss 9, having its apex toward the rear of the plate, and toward the slot 8. At the large or forward end or base of the boss the metal of the boss has been partly cut away, and partly pressed out of the contour of the boss into the plane of the main structure leaving the two rearwardly extending hooks, projections, or prongs 10 lying in said plane of the main body of the member A or in a plane below said forward end of the boss and contiguous the aperture between plate and boss. Between the projections 10 is the recess 11 having a rounded end margin as at 22. By cutting two longitudinal slits in the boss 9, the spring 12 is formed, terminating near the open end of recess 11. This spring tongue 12 is provided at its free end with the projection 13 and a corresponding recess on the other side thereof.

The member or plate B, having the slots 14 for securing the web thereto, is provided with the heart-shaped or tapered boss 15, adapted to fit within the larger boss 9 of member A. At the large end or base of boss 15 are provided the slots 16. Located intermediate these slots 16 is the part 18 connecting the boss with the main body of the plate. This part 18 has preferably a curved or semi-circular formation to correspond with the curved margin 22 of recess 11, with which said part is adapted to coöperate. Located at approximately the middle of the larger end of boss 15 is the projection 19.

The operation of my device is as follows: In connecting the two parts of the separable fastener, the plate or member A is placed over the plate or member B, so that the boss 15 of member B will lie within the concave portion of the underside of member A, formed by the boss 9, the projection 19 lying within the concavity on the underside of tongue 12, formed by the projection 13. In this position the projections or hooks 10 will be permitted to enter the slots 16 at the large end of boss 15. By pulling the members or plates A and B in opposite directions, the projection 13 will be forced beyond the projection 19, and the projections or hooks 10 will move into the slots 16, when the engagement of the parts is finally established. The formation of the two bosses, the boss 15 being substantially smaller than the concave recess under boss 9, permits a limited rotative movement between said members or plates A and B around a center substantially the center of part 18. The pull of the webbing maintains engagement positively between margin 22 of recess 11, and part 18. The spring 12 exerts no pressure when the parts are in the connected position. It serves simply to prevent an accidental disengagement of the parts.

I do not desire to confine myself to the specific form of spring engagement shown in the drawings. It will be obvious that any suitable form of projection on one member, adapted to have resilient coöperation with the other member for preventing accidental disengagement of said members, in combination with the other elements recited, may be within the scope of my invention as defined by the appended claims.

What I claim is:—

1. In a separable fastener, the combination of a plate provided with a boss struck up from the plane thereof, connected at its rear end and disconnected at its forward end from said plate, said plate having two rearwardly extending projections near the forward end of the boss in a plane below said boss, and a second plate provided with a boss adapted to fit within the first mentioned boss and slotted to receive the said rearwardly extending projections.

2. In a separable fastener, the combination of a plate provided with a tapered boss struck up from the plane thereof, connected at its smaller end with said plate and disconnected at its larger end from said plate, said plate having two rearwardly extending projections near the larger end of the boss in a plane below said boss, and a second plate provided with a boss adapted to fit within the first mentioned boss, and slotted to receive the said rearwardly extending projections.

3. In a separable fastener, the combination of a plate provided with a boss struck up from the plane thereof, connected at its rear end and disconnected at its forward end from said plate, said plate having two rearwardly extending projections near the forward end of the boss in a plane below said boss, a second plate provided with a boss adapted to fit within the first mentioned boss and slotted to receive the said rearwardly extending projections, and means for securing resilient coöperation between said plates to prevent accidental disengagement.

4. In a separable fastener, the combination of a plate having a tapered boss struck up from the plane thereof, said boss partly disconnected from the plate, forming an aperture between plate and boss, two projections contiguous to said aperture, extending in a plane below the boss and toward its tapered end, and a second plate having a boss adapted to fit within the boss of the first plate, and slotted to receive the said projections.

5. A clasp, comprising two flat members, each provided with a tapered boss, one larger and adapted to superimpose the other, said members apertured as follows, an aperture at the base of the larger boss with two substantially parallel prongs projecting therein and extending toward the small end of said boss, and two slots at the base of the smaller boss for receiving said prongs, and spring and projection means for preventing accidental disengagement of said two members.

HARVEY E. BERKEY.

Witnesses:
   JAS. W. DRAPE,
   R. B. LEAN.